(12) United States Patent
Sakuda et al.

(10) Patent No.: US 11,117,611 B2
(45) Date of Patent: Sep. 14, 2021

(54) STEERING SYSTEM

(71) Applicant: JTEKT CORPORATION, Osaka (JP)

(72) Inventors: Masayoshi Sakuda, Kashihara (JP); Daiki Goto, Hamamatsu (JP); Kazuki Fujiwara, Toyohashi (JP); Akihiro Taniyama, Toyohashi (JP); Shoin Kume, Hamamatsu (JP); Syunya Kouketsu, Kosai (JP)

(73) Assignee: JTEKT CORPORATION, Osaka (JP)

( * ) Notice: Subject to any disclaimer, the term of this patent is extended or adjusted under 35 U.S.C. 154(b) by 57 days.

(21) Appl. No.: 16/686,826

(22) Filed: Nov. 18, 2019

(65) Prior Publication Data
US 2020/0207400 A1  Jul. 2, 2020

(30) Foreign Application Priority Data

Dec. 26, 2018  (JP) .............................. JP2018-243481

(51) Int. Cl.
| | | |
|---|---|---|
| *B62D 1/184* | (2006.01) | |
| *B62D 1/19* | (2006.01) | |
| *F16G 11/04* | (2006.01) | |

(52) U.S. Cl.
CPC .............. *B62D 1/184* (2013.01); *B62D 1/195* (2013.01); *F16G 11/044* (2013.01)

(58) Field of Classification Search
CPC .......... B62D 1/184; B62D 1/195; B62D 1/16; F16G 11/044
See application file for complete search history.

(56) References Cited

U.S. PATENT DOCUMENTS

| | | | |
|---|---|---|---|
| 2004/0113408 A1* | 6/2004 | Yamamoto ............. | B62D 1/184 280/775 |
| 2017/0057537 A1* | 3/2017 | Handy ................... | B62D 1/185 |
| 2017/0072987 A1* | 3/2017 | Dasadi .................. | B62D 1/184 |
| 2018/0222520 A1 | 8/2018 | Nagatani et al. | |
| 2018/0251148 A1 | 9/2018 | Osawa et al. | |
| 2020/0247457 A1* | 8/2020 | Ponikiewski .......... | B62D 1/184 |

FOREIGN PATENT DOCUMENTS

| | | |
|---|---|---|
| EP | 3357789 A2 | 8/2018 |
| JP | 2008-307959 A | 12/2008 |
| JP | 2009-196500 A | 9/2009 |
| JP | 2018-127062 A | 8/2018 |
| JP | 2018-202962 A | 12/2018 |

OTHER PUBLICATIONS

May 26, 2020 Extended Search Report issued in European Patent Application No. 19212530.0.

* cited by examiner

*Primary Examiner* — Drew J Brown
(74) *Attorney, Agent, or Firm* — Oliff PLC (57) ABSTRACT

A steering system includes a rod member, a housing, and a clamping member. The housing has a clamping slit and includes a first clamp-receiving portion and a second clamp-receiving portion that project so as to sandwich the clamping slit therebetween. The clamping member includes a fixed cam, a clamping shaft, a rotary cam, and a clamping lever. The fixed cam is fitted in the first clamp-receiving portion from an outer side of the first clamp-receiving portion. The fixed cam has a third through hole extending through the fixed cam coaxially with a first axis. The third through hole has a small diameter portion at a first portion close to the rotary cam and a large diameter portion having a diameter larger than a diameter of the small diameter portion at a second portion away from the rotary cam.

3 Claims, 10 Drawing Sheets

STEERING SYSTEM

INCORPORATION BY REFERENCE

The disclosure of Japanese Patent Application No. 2018-243481 filed on Dec. 26, 2018 including the specification, drawings and abstract is incorporated herein by reference in its entirety.

BACKGROUND

1. Technical Field

The present disclosure relates to a steering system that steers a vehicle, for example.

2. Description of Related Art

A steering system including a column tube that holds a column shaft to which a steering member is connected such that the column shaft is rotatable, and a cylindrical housing that holds the column tube such that the column tube is slidable and that is fixed to a vehicle is known (see Japanese Unexamined Patent Application Publication No. 2018-127062 (JP 2018-127062 A), for example). Such a steering system is operated as follows. A vehicle's driver (hereinafter simply referred to as the driver) unlocks the column tube by operating a clamp unit, thereafter changes a position of the steering member to a desired position, and lock the position of the steering member by locking the column tube to the housing by operating the clamp unit.

SUMMARY

The inventors of the present disclosure have found that, a force applied by the driver to the clamp unit by operating the clamp unit to lock the column tube by reducing a diameter of a part of the housing is equal to or larger than a design value, which causes the driver to feel that the clamping operation requires heavy physical effort. As a result of further studies, the inventors have found that interference between a clamping shaft included in the clamp unit and the housing occurs when the diameter of the part of the housing is reduced, resulting in an increase in physical effort required to perform the clamping operation.

The present disclosure provides a steering system in which an increase in physical effort required to operate a clamping member to lock a position of a steering member is reduced.

A steering system according to a first aspect of the present disclosure includes a rod member, a housing, and a clamping member. A steering member is connected directly or indirectly to the rod member. The housing has a retaining hole for retaining the rod member such that the rod member is movable in an axial direction. The housing has a clamping slit extending through a circumferential wall of the housing in a radial direction and elongated in the axial direction and includes a first clamp-receiving portion and a second clamp-receiving portion both projecting in the radial direction so as to sandwich the clamping slit between the first clamp-receiving portion and the second clamp-receiving portion. The first clamp-receiving portion has a first through hole extending through the first clamp-receiving portion along a first axis that intersects the radial direction. The second clamp-receiving portion has a second through hole extending through the second clamp-receiving portion along a second axis that intersects the radial direction. The clamping member is configured to clamp the housing so as to reduce a diameter of a part in the axial direction of the retaining hole to lock a position of the rod member. The clamping member includes a fixed cam, a clamping shaft, a rotary cam, and a clamping lever. The fixed cam is fitted in the first clamp-receiving portion from an outer side of the first clamp-receiving portion. The fixed cam has a third through hole extending through the fixed cam coaxially with the first axis. The clamping shaft is inserted through the first through hole, the second through hole, and the third through hole. The rotary cam is configured to relatively move away from or toward the fixed cam as the rotary cam rotates relative to the fixed cam. The clamping lever is connected to the rotary cam. The third through hole has a small diameter portion at a first portion close to the rotary cam and a large diameter portion having a diameter larger than a diameter of the small diameter portion at a second portion away from the rotary cam.

In the steering system according to the first aspect, in an axial direction of the fixed cam, a length of the large diameter portion may be larger than a length of the small diameter portion.

In the steering system according to the first aspect, the first through hole and the second through hole may be arranged such that in a state where the clamping member does not cause the housing to clamp the rod member, the first axis and the second axis are not coincident with each other, but in a state where the clamping member causes the housing to clamp the rod member, the first axis and the second axis are coincident with each other.

A steering system according to a second aspect of the present disclosure includes a rod member, a housing, and a clamping member. A steering member is connected directly or indirectly to the rod member. The housing has a retaining hole for retaining the rod member such that the rod member is movable in an axial direction. The housing has a clamping slit that extends through a circumferential wall of the housing in a radial direction and is elongated in the axial direction and includes a first clamp-receiving portion and a second clamp-receiving portion both projecting in the radial direction so as to sandwich the clamping slit between the first clamp-receiving portion and the second clamp-receiving portion. The first clamp-receiving portion has a first through hole extending through the first clamp-receiving portion along a first axis that intersects the radial direction. The second clamp-receiving portion has a second through hole extending through the second clamp-receiving portion along a second axis that intersects the radial direction. The clamping member is configured to clamp the housing so as to reduce a diameter of a part in the axial direction of the retaining hole to lock a position of the rod member. The clamping member includes a clamping shaft inserted through the first through hole and the second through hole. The first through hole and the second through hole are arranged such that in a state where the clamping member does not cause the housing to clamp the rod member, the first axis and the second axis are not coincident with each other, but in a state where the clamping member causes the housing to clamp the rod member, the first axis and the second axis are coincident with each other.

The steering system according to the first or second aspect can reduce interference between the housing and the clamping shaft that occurs during an operation of clamping the rod member using the housing to thus at least reduce a phenomenon in which heavy physical effort is required to perform the clamping operation.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Embodiments of a steering system according to the present disclosure are described below with reference to the drawings. It should be noted that any embodiment described below illustrates a comprehensive or specific example. Numerical values, shapes, materials, elements, arrangements and connections of the elements, steps, and sequences of the steps are merely exemplary and not intended to limit the applicable embodiment. Of the elements of the embodiments presented below, any element that is not described in an independent claim indicating a most superordinate concept is described as an optional element.

It should be noted that the drawings are schematics in which emphasis, omission, and ratio adjustment are made as appropriate to illustrate the present disclosure, and may differ from actual shapes, positional relationships, and ratios.

Figure 1:
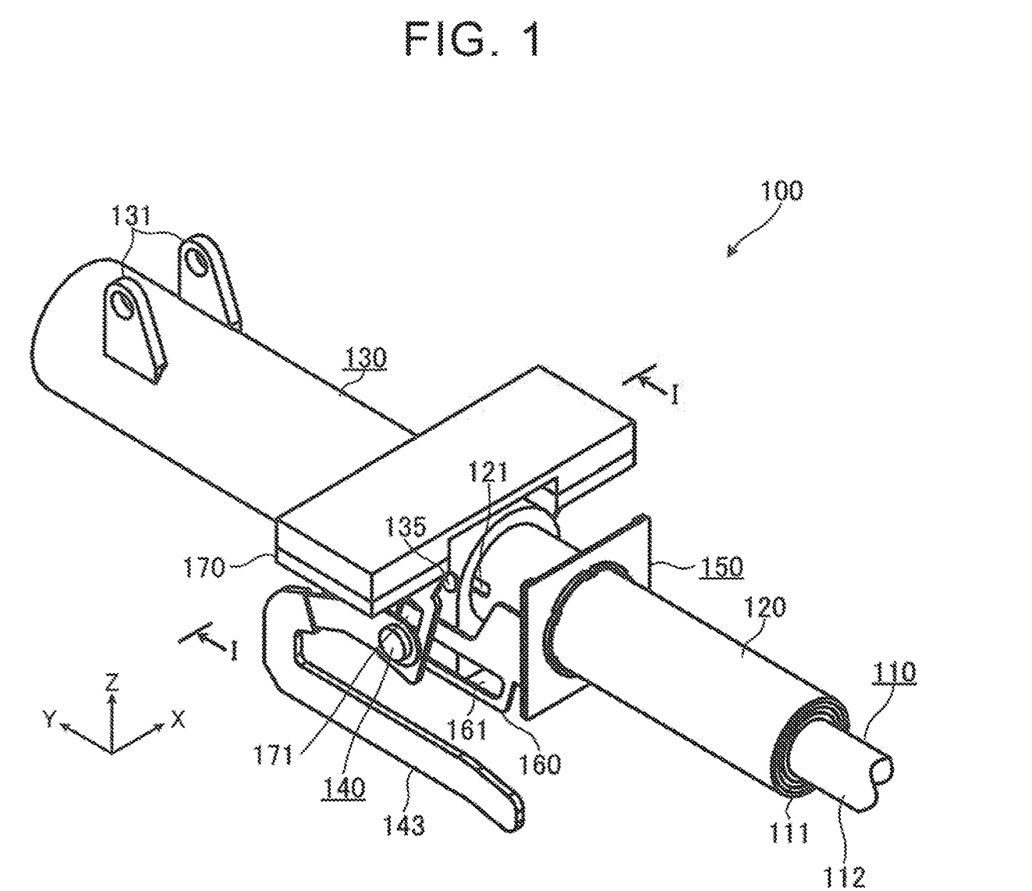
FIG. 1 is a perspective view illustrating a configuration of a steering system according to an embodiment of the present disclosure.
Figure 2:
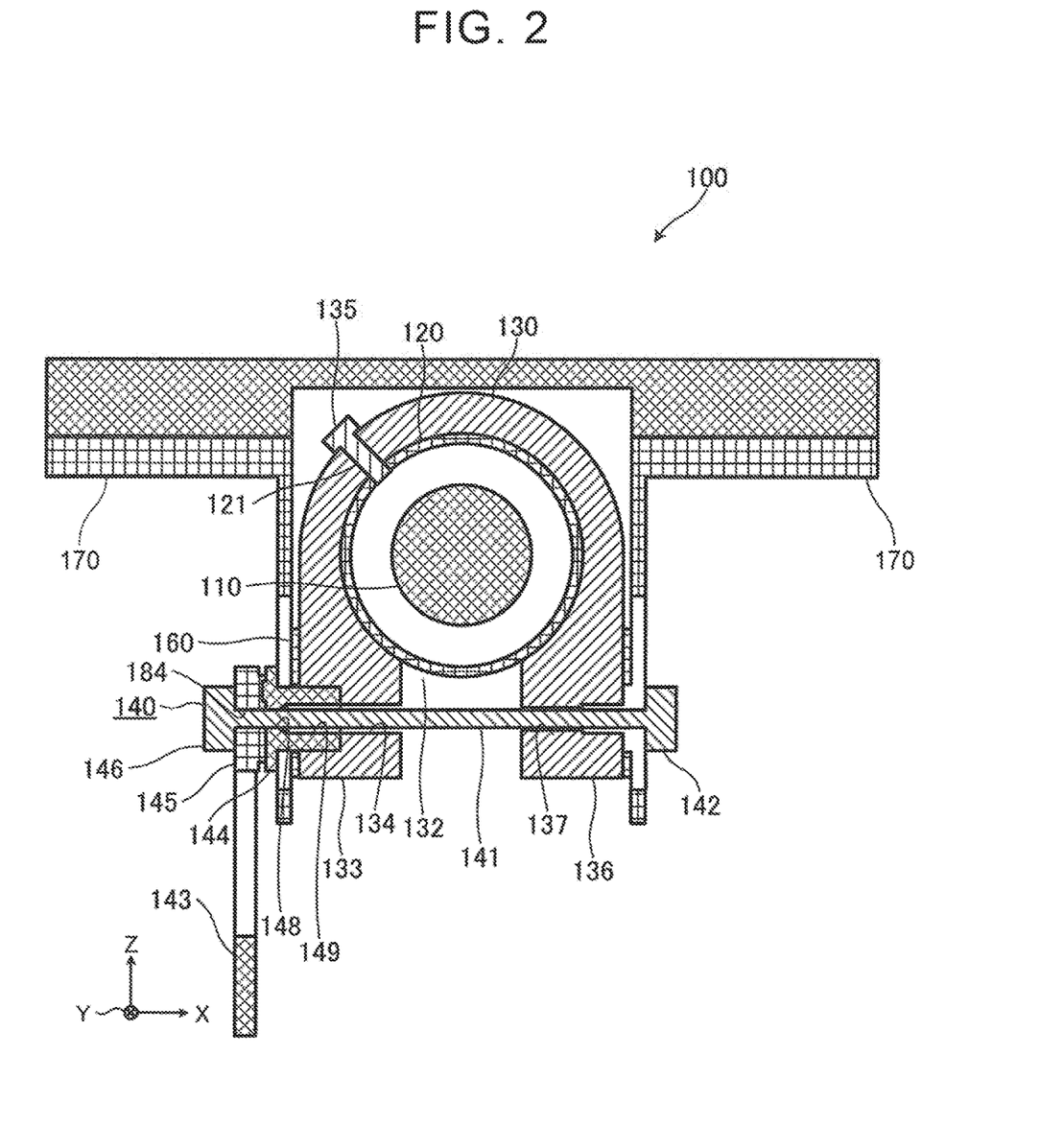
FIG. 2 is a sectional view illustrating the steering system in a state where a housing is not clamped taken along a line I-I of FIG. 1.
Figure 3:
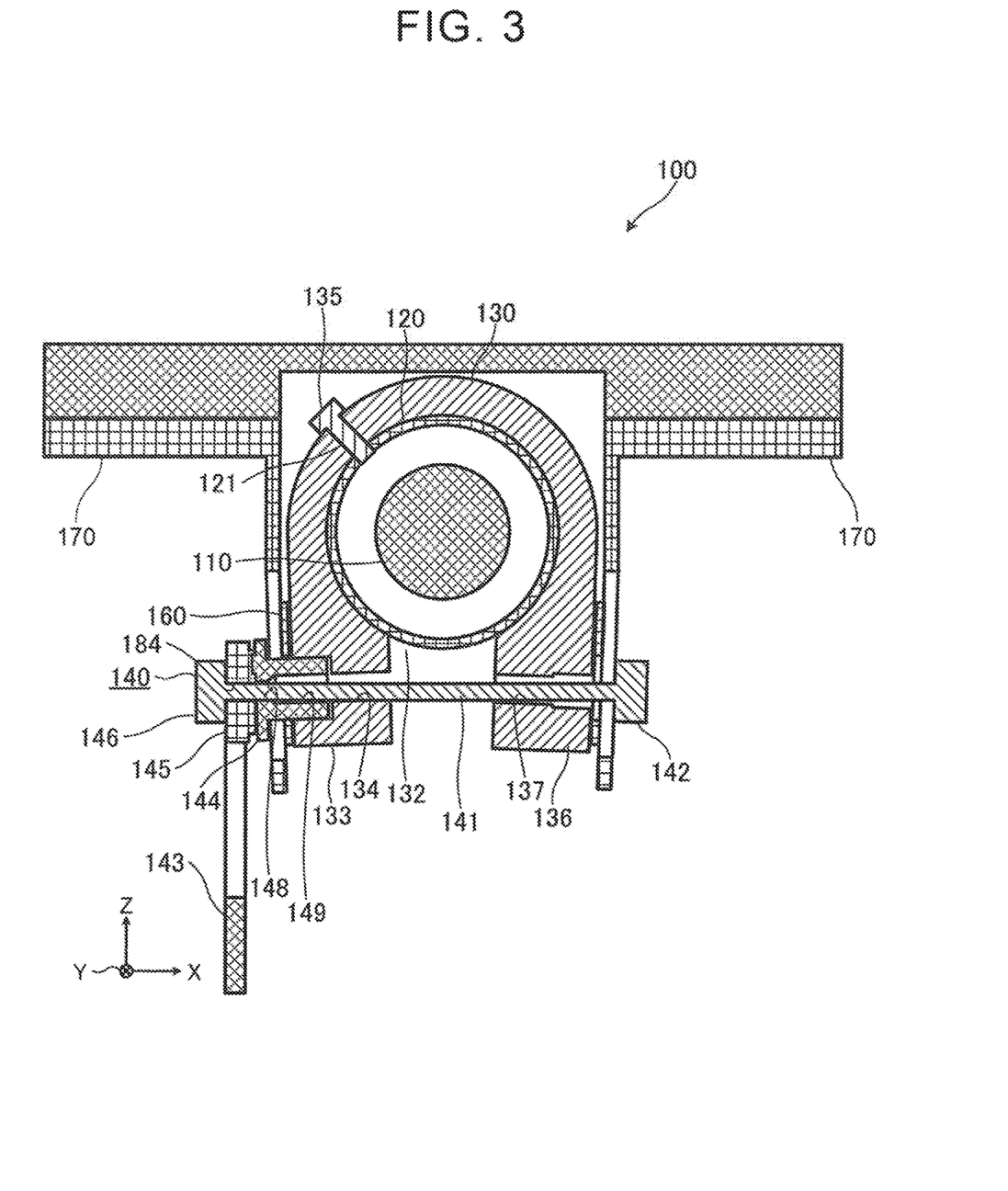
FIG. 3 is a sectional view illustrating the steering system in a state where the housing is clamped taken along the line I-I of FIG. 1.

FIG. 1 is a perspective view illustrating a configuration of a steering system 100 according to an embodiment of the present disclosure. FIG. 2 is a sectional view illustrating the steering system 100 in a state where a housing 130 is not clamped taken along a line I-I of FIG. 1. FIG. 3 is a sectional view illustrating the steering system 100 in a state where the housing 130 is clamped taken along the line I-I of FIG. 1. As illustrated in FIG. 1 to FIG. 3, the steering system 100 steers steered wheels of a vehicle in response to a steering operation performed by a driver and includes a column tube 120 that is an example of the rod member, the housing 130, and a clamping member 140. The steering system 100 according to the embodiment further includes a column shaft 110, a first energy absorbing member 150, and two second energy absorbing members 160. Although the steering system 100 further includes a shaft member, e.g., an intermediate shaft connected to the column shaft 110, and a steering operation mechanism, e.g., a rack-and-pinion mechanism, illustration and description of them are omitted.

When used in a normal condition in which no collision has occurred, the steering system 100 allows changing a position of a steering member so as to conform to a physique of a driver, for example, by loosening the clamping member 140 and sliding the column tube 120 relative to the housing 130 in an axial direction (a Y-axis direction in FIGS. 1 to 3). The steering system 100 can lock a position of the column tube 120 at the changed position by clamping the housing 130 using the clamping member 140. According to the embodiment, the steering system 100 can change a tilt position of the housing 130 relative to a vehicle body. The housing 130 can be locked to and unlocked from the tilt position using the clamping member 140 as well.

The column shaft 110 has a distal end to which the steering member to be operated by the driver for steering is attached. The column shaft 110 is inserted in the housing 130 with the column tube 120 therebetween so as to be rotatably held by the housing 130 and transmit a steering angle of the steering member to the steering operation mechanism. According to the embodiment, the column shaft 110 is held by the column tube 120 via a first bearing 111 so as to be fixed in the axial direction relative to the column tube 120 but rotatable in a circumferential direction. The column shaft 110 is configured to extend and retract as the column tube 120 extends from and retreats into the housing 130 while maintaining its capability of transmitting the steering angle. More specifically, for example, the column shaft 110 includes a first shaft 112 held by the first bearing 111 and a second shaft (not illustrated) held by the housing 130 via a second bearing (not illustrated). The first shaft 112 and the second shaft are formed to provide a telescopic structure in which, as the column tube 120 extends from and retreats into the housing 130, the first shaft 112 extends from and retreats into the second shaft, causing the column shaft 110 to extend and retract. The first shaft 112 and the second shaft are formed to provide a spline engagement structure so as to be capable of transmitting a steering angle of the steering member.

The column tube 120 is an embodiment of the rod member and is a member that is typically referred to as a column jacket and holds the column shaft 110 such that the column shaft 110 is rotatable. The column tube 120 holds the steering member via the column shaft 110. The column tube 120 is held by the housing 130 attached to the vehicle body to position the steering member via the column shaft 110 at a predetermined position. Although no particular limitation is imposed on a shape of the column tube 120, the column tube 120 according to the embodiment is cylindrical (tubular) and inserted in and held by the housing 130 that has a retaining hole extending in the axial direction. The column tube 120 internally holds the column shaft 110 via a bearing, such as the first bearing 111. The column tube 120 is movable together with the column shaft 110 held by the column tube 120 relative to the housing 130 in the axial direction (the Y-axis direction in FIGS. 1 to 3).

According to the embodiment, a tube elongated hole 121 elongated in the axial direction and radially extending through the column tube 120 is provided in the column tube 120. A pin-shaped third energy absorbing member 135 that is to be placed to extend through the tube elongated hole 121 is fixed to the housing 130. The third energy absorbing member 135 is positioned inside the tube elongated hole 121 so as not to interfere with movement of the column tube 120 relative to the housing 130 during use in the normal condition. When used in the normal condition, a movable range in the axial direction of the column tube 120 relative to the housing 130 is limited by abutment between an end edge of the tube elongated hole 121 in a longitudinal direction and the third energy absorbing member 135.

When a secondary collision occurs, the end edge of the tube elongated hole 121 breaks the third energy absorbing member 135. By being broken, the third energy absorbing member 135 absorbs impact of the secondary collision and reduces impact exerted on the driver.

Figure 4:
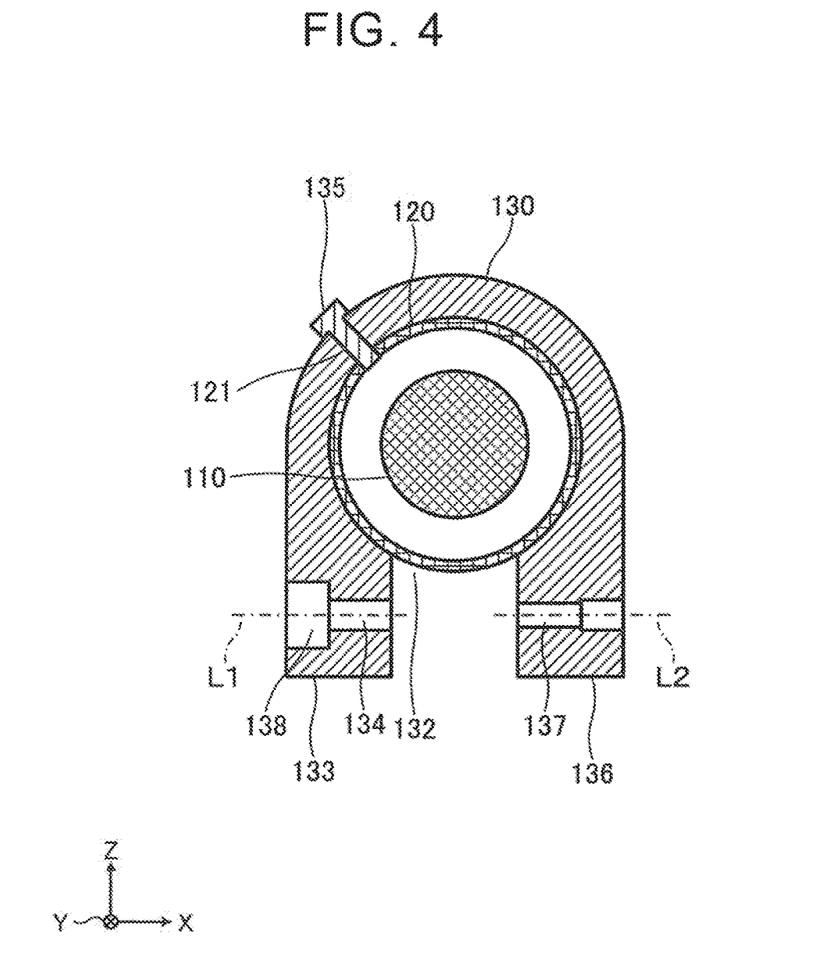
FIG. 4 is a sectional view of the steering system illustrated in FIG. 2 with some parts including a clamping member omitted.

The housing 130 is a cylindrical member that holds the column tube 120 such that the column tube 120 is movable in the axial direction (the Y-axis direction in FIGS. 1 to 3) relative to the vehicle body. The housing 130 has, at an axial end of the housing 130 on a side (rearward side of the vehicle body) close to the steering member, a clamping slit 132 (see FIG. 2, for example) extending through a circumferential wall of the housing 130 in a radial direction (a Z-axis direction in FIGS. 2 to 4) and elongated in the axial direction and includes a first clamp-receiving portion 133 and a second clamp-receiving portion 136 both projecting in the radial direction so as to sandwich the clamping slit 132 therebetween. When not clamped with the clamping member 140, the first clamp-receiving portion 133 has a first through hole 134 having, as its central axis, a first axis L1 (see FIG. 4) that is perpendicular to both the direction (the Z-axis direction in FIGS. 2 to 4) in which the clamping slit 132 extends through the circumferential wall and the axial direction of the column tube 120. The second clamp-receiving portion 136 has a second through hole 137 having a second axis L2 as its central axis. As illustrated in FIG. 4 where some parts including the clamping member 140 are omitted, the first through hole 134 and the second through hole 137 are arranged such that the first axis L1 and the second axis L2 are coincident with each other.

Although no particular limitation is imposed on a material of the housing 130, the housing 130 according to the embodiment is made of an alloy of which major component is aluminum.

Although no particular limitation is imposed on shapes of the first through hole 134 and the second through hole 137, the first through hole 134 and the second through hole 137 according to the embodiment are cylindrical. A fixed cam hole 138 into which a fixed cam 144, which is described later, is to be inserted is provided on an end of the first through hole 134 on a side opposite from the second clamp-receiving portion 136. The fixed cam hole 138 is open in an outer surface of the first clamp-receiving portion 133. The fixed cam hole 138 has a non-circular cross-section taken perpendicularly to the first axis L1 so as to prevent rotation of the fixed cam 144 fitted in the fixed cam hole 138 about the first axis L1. The cross-section of the fixed cam hole 138 according to the embodiment is rhombic.

A clamping shaft 141 of the clamping member 140, which is described later, is inserted through the first through hole 134 and the second through hole 137. A clearance between the first clamp-receiving portion 133 and the second clamp-receiving portion 136 arranged to face each other can be narrowed using the clamping member 140. When the clearance between the first clamp-receiving portion 133 and the second clamp-receiving portion 136 is narrowed, the housing 130 circumferentially clamps the column tube 120 inserted in the housing 130 to stationarily hold the column tube 120.

According to the embodiment, a pair of first hinge members 131 project from the housing 130 on a side (forward side of the vehicle body) opposite from the steering member in the axial direction (the Y-axis direction in FIG. 1). Second hinge members (not illustrated) fixed to the vehicle body are rotatably connected to the first hinge members 131 using a shaft. The housing 130 is thereby fixed to the vehicle body to be tiltable relative to the vehicle body. Two fixing brackets 170 are plane-symmetrically arranged at positions close to the steering member (rearward side of the vehicle body) relative to the first hinge members 131 so as to sandwich the first clamp-receiving portion 133 and the second clamp-receiving portion 136 therebetween. The fixed brackets 170 are fixed to the vehicle body. Each of the two fixed brackets 170 includes a fixing elongated hole 171 that is arcuate about a rotation center of the first hinge members 131. The fixed brackets 170 are configured to be pressed by the clamping member 140 inserted through the two fixing elongated holes 171 against the first clamp-receiving portion 133 and the second clamp-receiving portion 136 of the housing 130 to thus lock a position of the housing 130 at a desired tilt position.

The clamping member 140 is a unit that clamps an end portion in the radial direction of the housing 130 at a position outside the column tube 120 to lock the position of the column tube 120. The clamping member 140 includes the clamping shaft 141, the fixed cam 144, a rotary cam 145, and a clamping lever 143.

The clamping shaft 141 is a rod member inserted through the first through hole 134 and the second through hole 137. The clamping shaft 141 includes, at its one end, a first flange 146 that engages with the rotary cam 145 and, at the other end, a second flange 142 that engages with an opening periphery of the second through hole 137 of the second clamp-receiving portion 136. No particular limitation is imposed on shapes of the clamping shaft 141, the first flange 146, and the second flange 142. At least one of the first flange 146 and the second flange 142 is detachably attached to the clamping shaft 141. When one of the first flange 146 and the second flange 142 is configured as such, the other of the first flange 146 and the second flange 142 may be integral with the clamping shaft 141. According to the embodiment, the clamping shaft 141 is an externally threaded shaft, and the first flange 146 and the second flange 142 are nuts screwed onto the clamping shaft 141.

Figure 5:
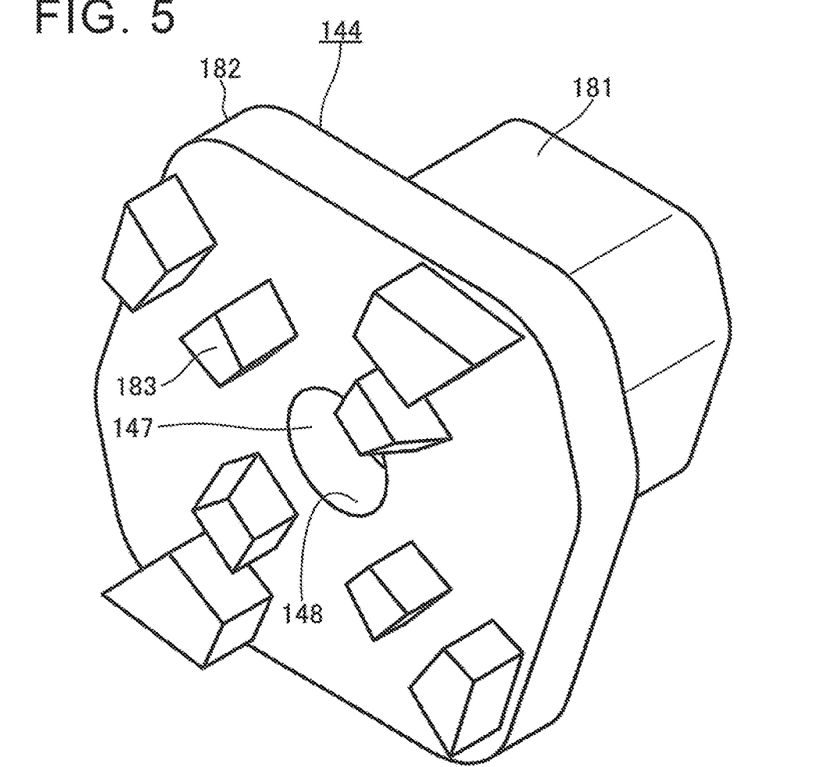
FIG. 5 is a perspective view illustrating a fixed cam.
Figure 6:
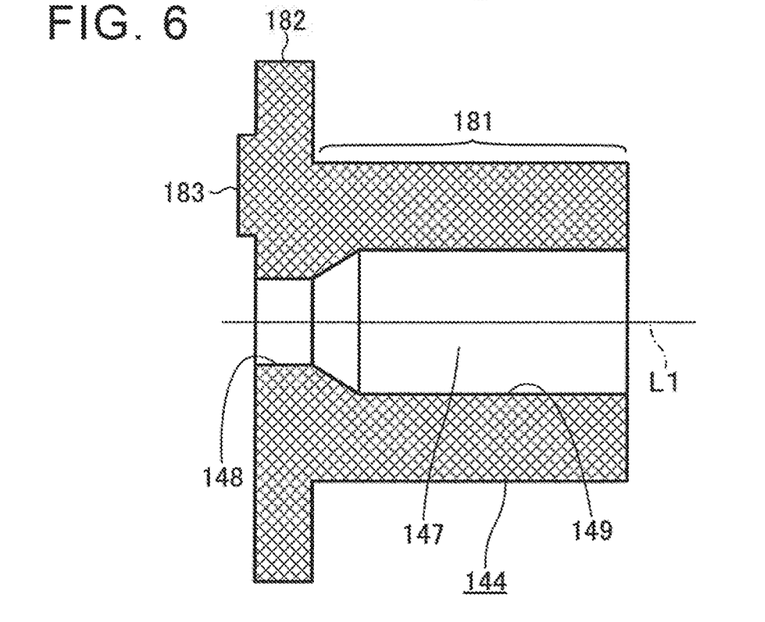
FIG. 6 is a sectional view illustrating the fixed cam taken along a plane passing through a first axis.

FIG. 5 is a perspective view illustrating the fixed cam 144. FIG. 6 is a sectional view illustrating the fixed cam 144 taken along a plane passing through the first axis L1. As illustrated in FIG. 6 and FIG. 2, for example, the fixed cam 144 has a third through hole 147 extending through the fixed cam 144 coaxially with the first axis L1 that is the central axis of the first through hole 134 when the fixed cam 144 is not clamped with the clamping member 140. A part, more specifically, a fit-in portion 181 of the fixed cam 144 is fitted in the first clamp-receiving portion 133 from an outer side of the first clamp-receiving portion 133. The fixed cam 144 is fitted in the first clamp-receiving portion 133 of the housing 130 so as to be non-rotatable about the first axis L1 but slidable in a direction of the first axis L1. According to the embodiment, the fit-in portion 181 of the fixed cam 144 has a rectangular (more specifically, rhombic) cross-section taken perpendicularly to the first axis L1. The fit-in portion 181 is fitted in the fixed cam hole 138 that is provided in the first clamp-receiving portion 133 and is identical in cross-section with the fit-in portion 181. This restricts rotation of the fixed cam 144 while allowing the fixed cam 144 to slide. The fit-in portion 181 has a size (width) that allows insertion of the fit-in portion 181 into an elongated hole 161 (see FIG. 1) provided in a corresponding one of the second energy absorbing members 160. The size (width) of the fit-in portion 181 allows insertion of the fit-in portion 181 into the fixing elongated hole 171 of the fixed bracket 170. The elongated hole 161 and the fixing elongated hole 171 are arranged such that their longitudinal directions intersect with each other. Hence, the fit-in portion 181 of the fixed cam 144 has the cross-section of approximately the same rhombic shape as a rhombus formed by overlaying the elongated hole 161 and the fixing elongated hole 171 on each other in a predetermined intersecting form.

Although no particular limitation is imposed on a material of the fixed cam 144, the fixed cam 144 according to the embodiment is made of a material that is higher in hardness than the material of the housing 130. More specifically, a hardened steel, for example, is employed as the material of the fixed cam 144. This is because the fixed cam 144 is a member that generates a clamping force of the clamping member 140 by rotating relative to the rotary cam 145, the fixed cam 144 is required to exhibit high durability to be resistant to wear and the like.

The fixed cam 144 includes a third flange 182 that radially extends at an end portion of the fit-in portion 181. When the clamping member 140 is operated for clamping, the third flange 182 presses the second energy absorbing member 160 where the elongated hole 161 is provided and the fixed bracket 170 where the fixing elongated hole 171 is provided against a surface of the first clamp-receiving portion 133. The third flange 182 includes a first cam 183 projecting from a surface of the third flange 182. When a second cam (not illustrated) provided on the rotary cam 145 rides on the first cam 183, a distance between the fixed cam 144 and the rotary cam 145 increases, while when the second cam descends from the first cam 183, the distance between the fixed cam 144 and the rotary cam 145 decreases.

The third through hole 147 of the fixed cam 144 extending through the third flange 182 to the fit-in portion 181 has one end portion and the other end portion that differ in diameter. The third through hole 147 according to the embodiment includes a small diameter portion 148 on the third flange 182 side and a large diameter portion 149 that is larger in diameter than the small diameter portion 148 on the fit-in portion 181 side. A length of the small diameter portion 148 along its central axis is smaller than a length of the large diameter portion 149 along its central axis. A portion that connects the small diameter portion 148 and the large diameter portion 149 is tapered. The diameter of the small diameter portion 148 is set to a value that allows positional locking of the clamping shaft 141 and does not to allow wobble of an end portion of the clamping shaft 141 in relation to the first clamp-receiving portion 133. More specifically, the diameter of the small diameter portion 148 is set to a value approximately 2% larger than a diameter of the clamping shaft 141, for example. The diameter of the large diameter portion 149 is set to a value that, even when the housing 130 is deformed by being clamped with the clamping member 140, at least reduces a phenomenon in which heavy physical effort is required to operate the clamping member 140 due to tight interference between a wall portion that circumferentially defines the large diameter portion 149 and the clamping shaft 141. More specifically, the diameter of the large diameter portion 149 is set to a value approximately 25% larger than the diameter of the clamping shaft 141, for example. According to the embodiment, the large diameter portion 149 and the first through hole 134 have the same or substantially the same diameter.

The rotary cam 145 has a fourth through hole 184 through which the clamping shaft 141 is inserted. The rotary cam 145 is configured to relatively move away from or toward the fixed cam 144 by riding on or descending from the first cam 183 of the fixed cam 144 as the rotary cam 145 pivots relative to the fixed cam 144. The clamping lever 143 is connected to the rotary cam 145. The clamping lever 143 projects toward the steering member. The driver can bring the clamping member 140 into the clamping state and unclamp the clamping member 140 by operating the clamping lever 143 to rotate the rotary cam 145 relative to the clamping shaft 141. More specifically, the rotary cam 145 is moved away from the fixed cam 144 to push out the first clamp-receiving portion 133 of the housing 130 toward the second clamp-receiving portion 136 relative to the first flange 146 of the clamping shaft 141 and push out the second clamp-receiving portion 136 toward the first clamp-receiving portion 133 relative to the second flange 142. As a result, a distance between the first clamp-receiving portion 133 and the second clamp-receiving portion 136 decreases. This narrows a width of the clamping slit 132, and clamps and locks the column tube 120 inserted in the housing 130. By performing the operation in reverse, the distance between the first clamp-receiving portion 133 and the second clamp-receiving portion 136 can be increased to achieve unclamping.

According to the embodiment, the clamping member 140 is configured so as to press each of the fixed brackets 170, each disposed outside a corresponding one of the first clamp-receiving portion 133 and the second clamp-receiving portion 136, and the second energy absorbing members 160 against a corresponding one of the first clamp-receiving portion 133 and the second clamp-receiving portion 136. As described above, operating the clamping lever 143 causes the clamping member 140 to narrow the clearance between the pair of the first clamp-receiving portion 133 and the second clamp-receiving portion 136 so that the housing 130 clamps and locks the position of the column tube 120. The clamping member 140 can lock the position of the column tube 120 and press each of the two second energy absorbing members 160 against a corresponding one of outer surfaces of the pair of the first clamp-receiving portion 133 and the second clamp-receiving portion 136 of the housing 130 to generate a normal force, so that a second kinetic friction force is generated at a secondary collision. Furthermore, while locking the position of the column tube 120 and retaining the second energy absorbing members 160 during use in the normal condition, the clamping member 140 can lock the position of the housing 130 at a desired tilt position by pressing the fixed brackets 170 via the second energy absorbing members 160 against the first clamp-receiving portion 133 and the second clamp-receiving portion 136.

Operations of the steering system 100 are described below.

During use in the normal condition, when the clamping member 140 is unclamped by operating the clamping lever 143 by the driver, the housing 130 becomes rotatable about the first hinge members 131, and the column tube 120 and the column shaft 110 become movable in the axial direction relative to the housing 130. In the state where the clamping member 140 is unclamped, as illustrated in FIG. 2, the first through hole 134, the second through hole 137, and the third through hole 147 are coaxially positioned, and interference between the clamping shaft 141 and a wall that circumferentially defines any one of the through holes does not occur. Accordingly, the driver can operate the clamping lever 143 with light physical effort.

Figure 7:
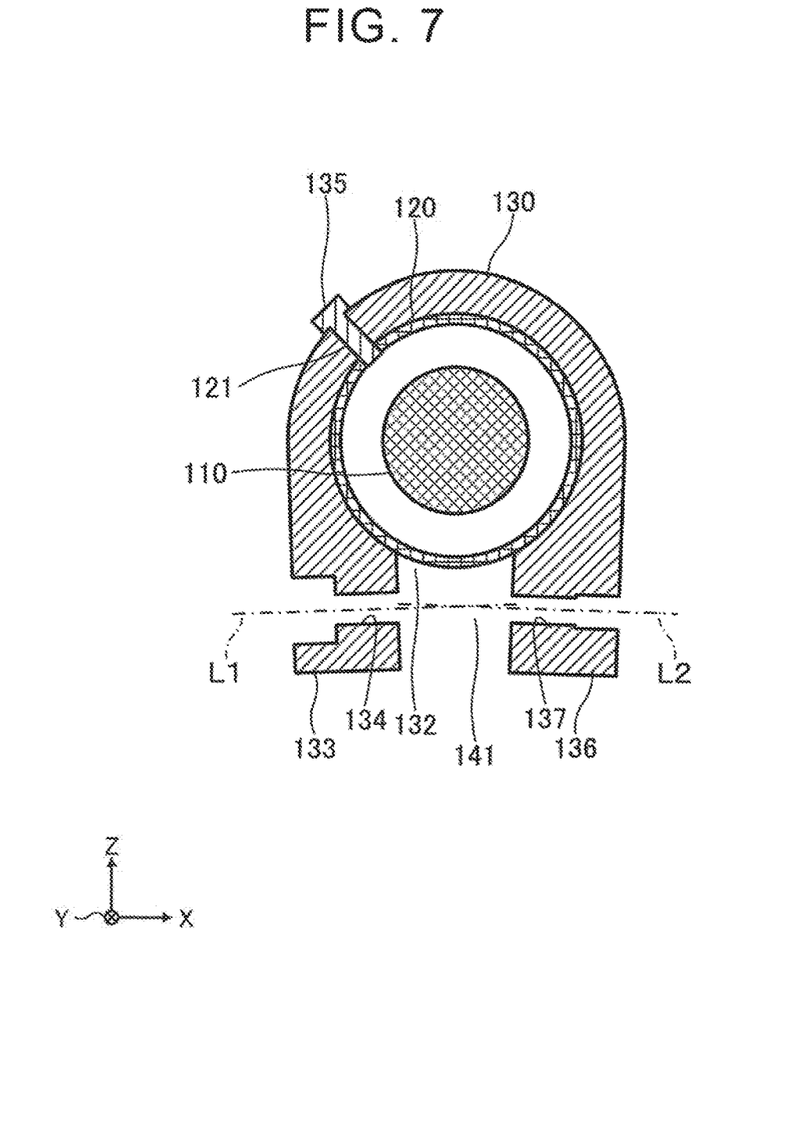
FIG. 7 is a sectional view of the steering system illustrated in FIG. 3 with some parts including the clamping member omitted.

In the state where the clamping member 140 is unclamped, the driver adjusts the steering member to a position appropriate for the driver by moving the steering member up or down and forward or rearward. To lock the steering member at the adjusted position, the driver rotates the clamping lever 143 to bring the clamping member 140 into the clamped state. Rotating the clamping lever 143 brings the first clamp-receiving portion 133 and the second clamp-receiving portion 136 to a state where their distal ends in the radial direction approach each other as illustrated in FIG. 3, causing the first axis L1 and the second axis L2 to intersect with each other as illustrated in FIG. 7. However, because the third through hole 147 of the fixed cam 144 has the small diameter portion 148 and the large diameter portion 149, a phenomenon in which the clamping shaft 141 interferes with the wall that circumferentially defines the third through hole 147 of the fixed cam 144 having high hardness and high rigidity can be avoided.

Thus, the driver can operate the clamping lever 143 to bring the clamping member 140 into the clamping state and lock the position of the steering member without heavy physical effort. Occurrence of an undesirable situation where, due to heavy physical effort required to operate the clamping lever 143, the driver mistakenly recognizes that clamping with the clamping member 140 is completed or gives up clamping before completing clamping can be avoided, and a predetermined clamping force of the clamping member 140 can be stably obtained. This makes absorbing impact of a secondary collision with the clamping force of the clamping member 140 in accordance with a desired profile achievable.

The applicable embodiment is not limited to the embodiment described above. For example, other embodiments may be implemented by combining elements described in the specification as desired or by eliminating one or more of the elements. Modifications of the embodiments obtained by making various modifications that may occur to those skilled in the art without departing from the purport of the present disclosure or, in other words, within the scope limited by the terms of the appended claims, are also encompassed in the applicable embodiment.

Figure 8:
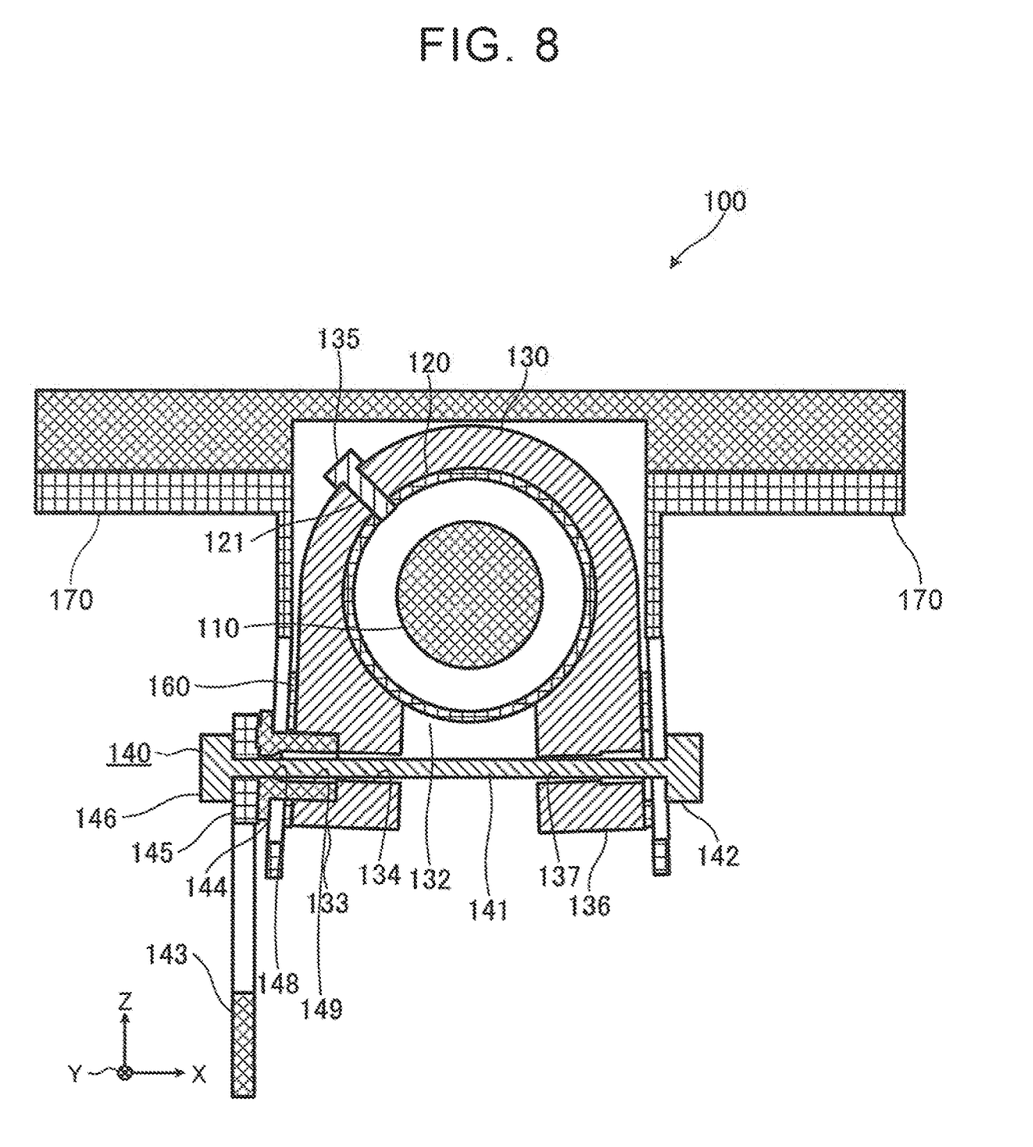
FIG. 8 is a sectional view illustrating a first modification of an arrangement of a first through hole and a second through hole in the not-clamped state.
Figure 9:
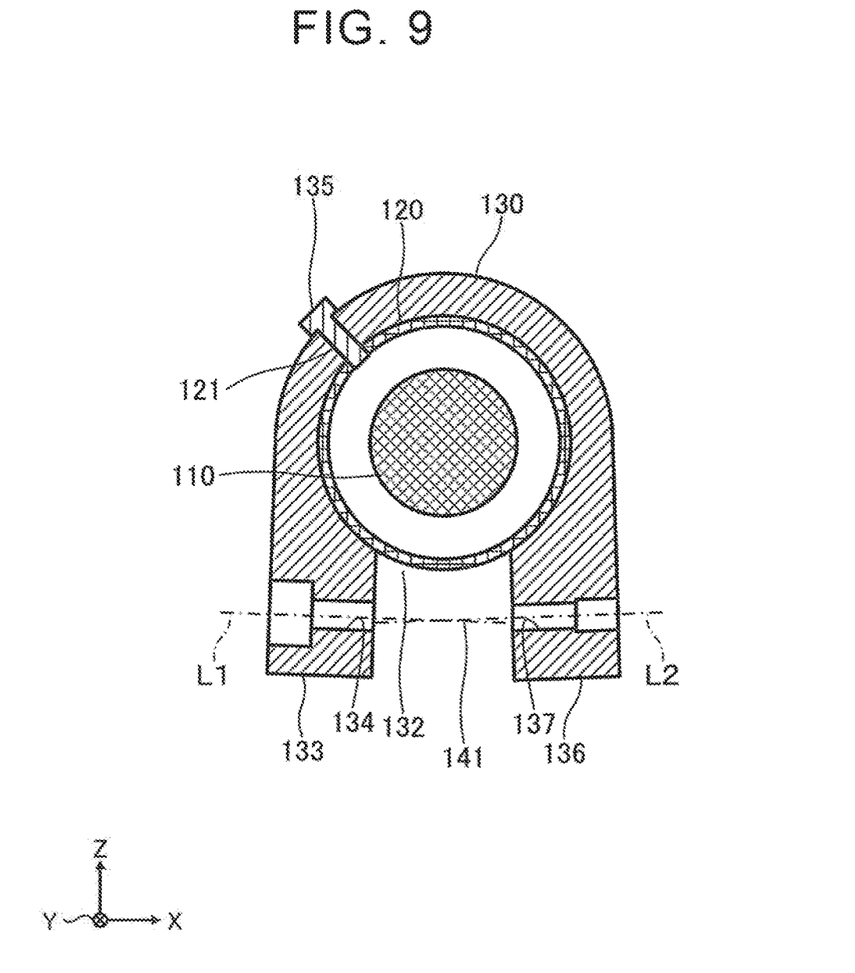
FIG. 9 is a sectional view of the steering system illustrated in FIG. 8 with some parts including the clamping member omitted.
Figure 10:
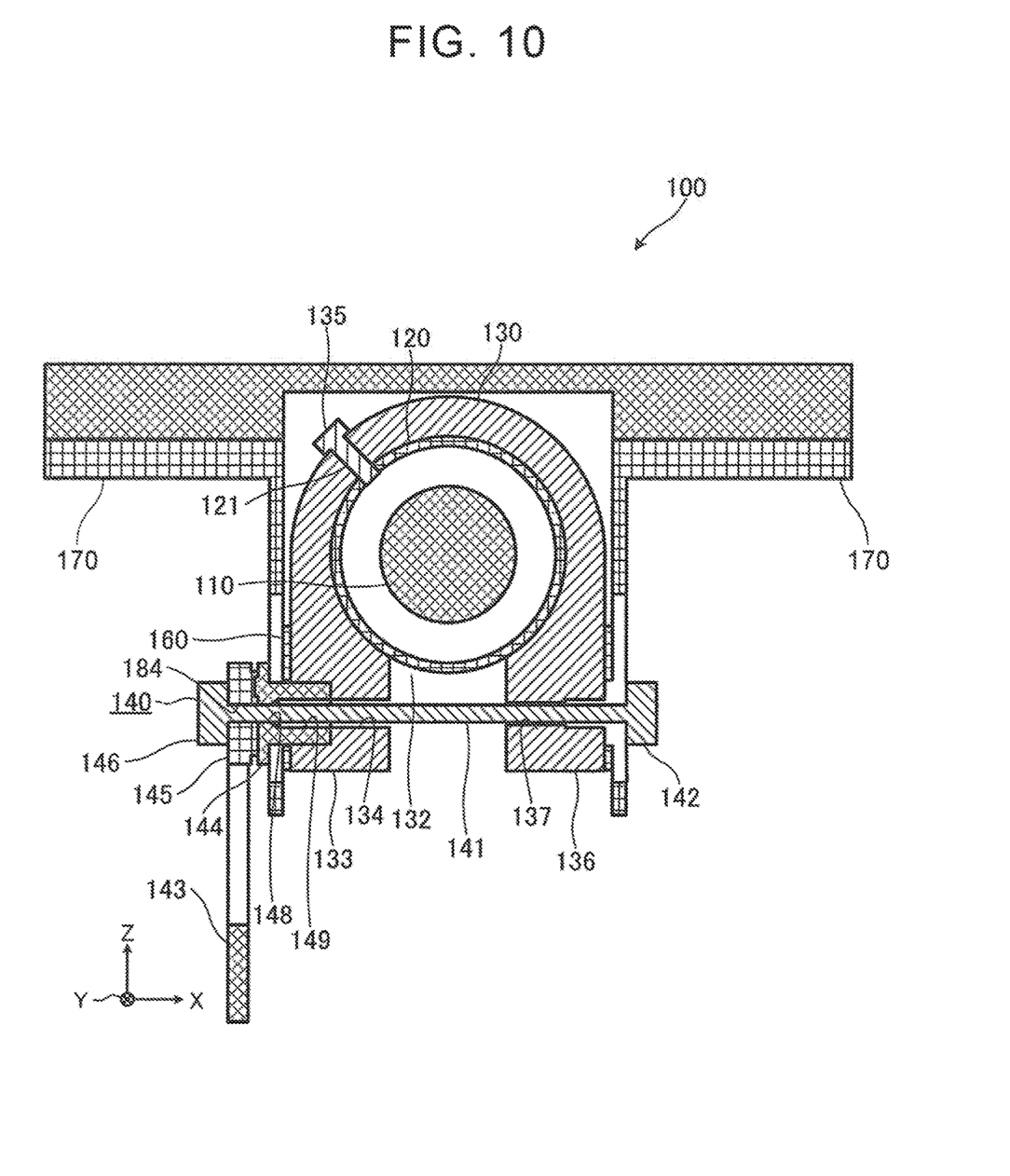
FIG. 10 is a sectional view illustrating the first modification of the arrangement of the first through hole and the second through hole in the clamped state.

For example, the first through hole 134 and the second through hole 137 may be arranged such that in the state where the clamping member 140 does not cause the housing 130 to clamp the column tube 120 that is the rod member, as illustrated in FIG. 8 and FIG. 9, the first axis L1 and the second axis L2 are not coincident with each other, but in the state where the clamping member 140 causes the housing 130 to clamp the column tube 120, as illustrated in FIG. 10, the first axis L1 and the second axis L2 are coincident with each other. In this modification, in the state where the clamping member 140 is not in the clamping state, a distance between the distal ends in the radial direction of the first clamp-receiving portion 133 and the second clamp-receiving portion 136 may be larger than a distance between their basal ends.

According to the modification, in the state where the clamping member 140 is in the clamping state, because the first through hole 134, the second through hole 137, and the third through hole 147 are coaxially positioned, interference between the clamping shaft 141 and the through holes does not occur. Hence, the driver can operate the clamping lever 143 without heavy physical effort to lock the position of the steering member. As illustrated in FIG. 8, in the state where the clamping member 140 is unclamped, because the fixed cam 144 has the large diameter portion 149, interference between the clamping shaft 141 and the wall that circumferentially defines the third through hole 147 does not occur. Hence, the driver can operate the clamping lever 143 smoothly.

Although the cylindrical column tube 120 is employed as an example of the rod member in the embodiment, the rod member is not limited to the column tube 120. The rod member to which the first energy absorbing member 150 is to be attached may be selected as desired in accordance with a structure of the steering system 100. The shape of a cross-section of the rod member taken perpendicularly to its axial direction is not limited to a complete round, but may be any shape, e.g., a polygon.

Figure 11:
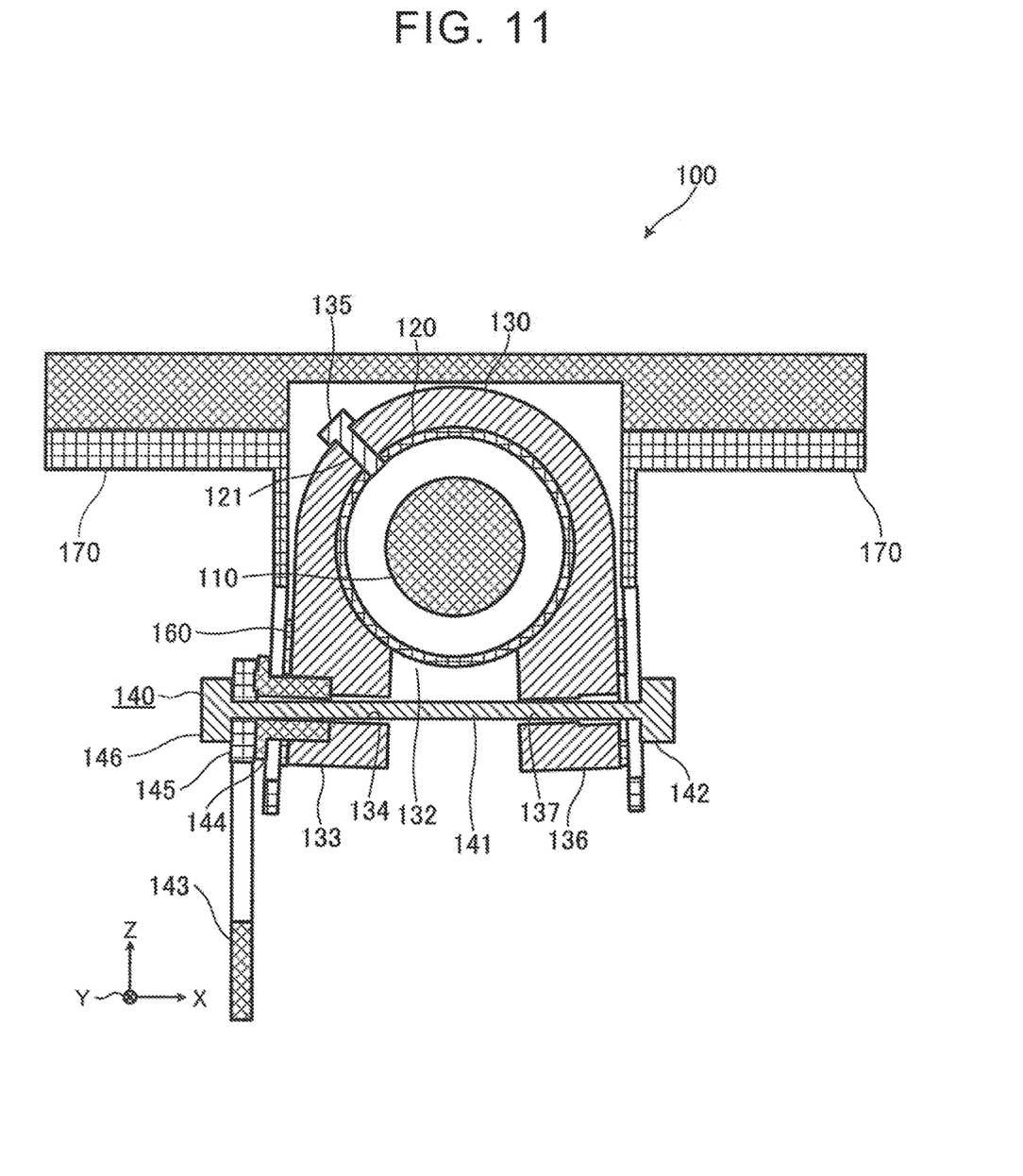
FIG. 11 is a sectional view illustrating a modification of a third through hole of the fixed cam in the not-clamped state.

In the configuration where the first through hole 134 and the second through hole 137 are arranged such that, in the state where the clamping member 140 does not cause the housing 130 to clamp the column tube 120 that is the rod member, the first axis L1 and the second axis L2 are not coincident with each other, but in the state where the clamping member 140 causes the housing 130 to clamp the column tube 120, the first axis L1 and the second axis L2 are coincident with each other as illustrated in FIG. 10, the third through hole 147 provided in the fixed cam 144 may not have portions that differ in diameter as illustrated in FIG. 11.

What is claimed is:
1. A steering system comprising:
a rod member to which a steering member is connected directly or indirectly;
a housing having a retaining hole for retaining the rod member such that the rod member is movable in an axial direction, the housing having a clamping slit extending through a circumferential wall of the housing in a radial direction and elongated in the axial direction and including a first clamp-receiving portion and a second clamp-receiving portion both projecting in the radial direction so as to sandwich the clamping slit between the first clamp-receiving portion and the second clamp-receiving portion,
the first clamp-receiving portion having a first through hole extending through the first clamp-receiving portion along a first axis that intersects the radial direction, and
the second clamp-receiving portion having a second through hole extending through the second clamp-receiving portion along a second axis that intersects the radial direction; and
a clamping member configured to clamp the housing so as to reduce a diameter of a part in the axial direction of the retaining hole to lock a position of the rod member, the clamping member including a fixed cam, a clamping shaft, a rotary cam, and a clamping lever,
the fixed cam being fitted in the first clamp-receiving portion from an outer side of the first clamp-receiving portion,
the fixed cam having a third through hole extending through the fixed cam coaxially with the first axis,
the clamping shaft being inserted through the first through hole, the second through hole, and the third through hole,
the rotary cam being configured to relatively move away from or toward the fixed cam as the rotary cam rotates relative to the fixed cam, and
the clamping lever being connected to the rotary cam, wherein the third through hole has a small diameter portion at a first portion close to the rotary cam and a large diameter portion having a diameter larger than a diameter of the small diameter portion at a second portion away from the rotary cam.

2. The steering system according to claim 1, wherein in an axial direction of the fixed cam, a length of the large diameter portion is larger than a length of the small diameter portion.

3. The steering system according to claim 1, wherein the first through hole and the second through hole are arranged such that in a state where the clamping member does not cause the housing to clamp the rod member, the first axis and the second axis are not coincident with each other, but in a state where the clamping member causes the housing to clamp the rod member, the first axis and the second axis are coincident with each other.

\* \* \* \* \*